United States Patent
Flolo

[11] Patent Number: 6,102,630
[45] Date of Patent: Aug. 15, 2000

[54] BALL NOSE END MILL INSERT

[75] Inventor: Dennis P. Flolo, Friendswood, Tex.

[73] Assignee: Tool Flo Manufacturing, Inc., Houston, Tex.

[21] Appl. No.: 09/228,720

[22] Filed: Jan. 12, 1999

[51] Int. Cl.[7] ................ B23C 5/20; B26D 1/12
[52] U.S. Cl. ................ 407/42; 407/54; 407/65; 407/103; 407/113
[58] Field of Search ................ 407/35, 40, 42, 407/54, 113, 114, 65, 103, 36, 38, 44, 47, 62, 66

[56] References Cited

U.S. PATENT DOCUMENTS

| | | | |
|---|---|---|---|
| 1,681,675 | 8/1928 | Miller | 407/36 X |
| 2,102,478 | 12/1937 | Miller | 407/38 |
| 2,240,360 | 4/1941 | Whitman | 407/38 |
| 3,629,919 | 12/1971 | Trevarrow, Jr. . | |
| 4,525,110 | 6/1985 | Stojanovski . | |
| 4,527,930 | 7/1985 | Harroun | 407/42 |
| 4,898,499 | 2/1990 | Tsujimura et al. . | |
| 4,919,573 | 4/1990 | Tsujimura et al. . | |
| 5,064,316 | 11/1991 | Stojanovski . | |
| 5,221,162 | 6/1993 | Okawa . | |
| 5,294,219 | 3/1994 | Shiratori et al. . | |
| 5,542,795 | 8/1996 | Mitchell . | |
| 5,921,720 | 7/1999 | Lemke | 407/42 |
| 5,924,826 | 7/1999 | Bystrom et al. | 407/103 |
| 5,951,213 | 9/1999 | Fauser et al. | 407/42 X |

*Primary Examiner*—Henry W. H. Tsai
*Attorney, Agent, or Firm*—Browning Bushman

[57] ABSTRACT

The back surface of a tool insert (12) is provided with a series of axially extending serrations (25) that form a contact surface to mate with similar serrations formed on the mounting surface (23) of a tool mount (13). The tops of the serrations are truncated so that the tapered walls of each serration are in full engagement with the adjacent walls of the mating serration. A threaded fastener (15) secures the insert (12) to the tool mount (13). A projection (18*a*) on the mounting surface resists axial movement of the insert. The serrations (25) extend toward the base of the insert to prevent lateral displacement resulting from circumferentially applied forces acting on the curved cutting surfaces (12*a*, 12*b*, 12*c*) of the insert. The centering and restraining action of the serrations maintain the inserts in proper alignment even after the mounting surface serrations of the tool mount begin to exhibit wear. The large surface area created by the serrations distributes the operating forces acting on the inserts and reduces localized wear points. The serrations provide large interfacing contact between the inserts and the mounts without resort to over or undersized components that may chatter or break.

17 Claims, 3 Drawing Sheets

BALL NOSE END MILL INSERT

FIELD OF THE INVENTION

The present invention relates to machining and milling tools used to bore, shape, or finish materials. More specifically, the present invention relates to a mechanism and method for mounting and securing a disposable cutter element to such a tool whereby the cutter element remains fixed and properly oriented on the tool mount.

BACKGROUND OF THE INVENTION

A variety of arrangements have been employed for attaching disposable, or "throwaway," cutting elements to tools used to bore, mill, shape, or otherwise process materials. These cutting elements, referred to herein as "inserts," take on a variety of shapes and forms as required to produce a desired cut in a workpiece. A typical method for securing an insert to a tool mount is to employ a threaded fastener to clamp the insert to the tool mount. One or more edge surfaces on the insert engage a complementary stop on the tool's mounting surface to prevent lateral or axial displacement of the insert during the milling operation.

Inserts having curved cutting surfaces such as used, for example, on a ball nose end mill, present special difficulty in maintaining a fixed, properly aligned connection with the tool to which they are mounted. The cutting surface of a ball nose end mill is curved relative to the axis of the rotating tool. Ball end mills initially exert an axially directed force into the tool body as the mill first engages the workpiece. Subsequently, as the bore is deepened, additional curved cutting areas of the insert are exposed to the walls of the deepening borehole. This change in both the location of contact and the amount of contact between the curved cutting surface and the wall of the bore changes the direction and magnitude of the displacing forces tending to move the insert relative to the tool mount.

Disposable inserts are periodically rotated on the ball nose end mill mount to present a new cutting edge, and worn inserts may be disposed of and replaced with new, sharp inserts. The material of the cutting element is typically substantially harder than that of the tool mount on which it is supported. For example, the inserts are frequently constructed of a tungsten carbide material, and the tool mount is frequently constructed of carbon steel. With usage, the engagement of the contacting surfaces between the tool insert and the tool mounting surface produce wear on the mounting surface that eventually permits undesired movement of the insert relative to the tool mount. The wear is accelerated as new inserts present unworn mounting surfaces for engagement with the partially worn mounting surfaces of the tool. Wear accumulates on the softer mounting surface of the tool until the mount wear becomes so severe that the tool can no longer hold the insert in proper alignment.

Inserts are held in position by providing interfering structures on the contact surfaces between the insert and the tool mount. The position fixing interface between the tool mounting surface and the insert is frequently made up of relatively complex surfaces that are difficult to fabricate. For example, it is common to employ projections extending away from the mount side of the insert and into recesses in the mounting surface of the tool to prevent relative motion between the two components. In such arrangements, it is necessary to employ one set of techniques and tools for fabricating the insert mounting surface and another set of techniques and tools for fabricating the tool mounting surface. In addition to the difficulty in manufacturing the engaging surfaces of these two components, the surface configurations are such that only a slight amount of wear in either of the surfaces permits undesired relative movement between the two components.

Prior art designs have also sought to correct the problem of insert movement by providing a clamping cap with protuberances that engage recesses in the insert and the tool body. See for example U.S. Pat. No. 4,525,110. The clamp cooperates with surfaces on the tool to precisely locate and hold the insert in a clamped cutting position. Devices of this type are complex in design and are difficult, and thus expensive, to fabricate.

Some prior art interface mounting surfaces employed between the insert and the tool mount have a single rail-like projection with a rectangular or V-shaped cross sectional profile to extend into a recess or groove with a complementary profile. See, for example, U.S. Pat. No. 5,542,795. To the extent that these structures require a relatively close fitting to prevent relative lateral motion, a rather high precision manufacturing process is required to form the elements. When a rectangular profile rail is used, some differences in size practically must exist between the projection profile and the recess profile to permit the two components to mate. This difference in size inherently frustrates the effort to fix the insert solidly to the tool body as required to resist the lateral displacement forces encountered during milling.

Another problem in the design of structures that interlock the insert and the tool mount is that the form of the interface may require the insert to be relatively thick in order to carry a complex interface design. As the insert becomes thicker, the supporting tool structure or shank must be reduced in size. As the tool shank becomes smaller, the tool is subject to an increase in chattering and tool breakage. On the other hand, if the insert is made overly thin in an effort to accommodate a complex interface structure, the insert itself is at increased risk of breaking.

SUMMARY OF THE INVENTION

The insert of the present invention employs a mounting arrangement that maintains proper alignment of the insert with the tool mount on which it is supported even after extended usage and partial wear of the mounting surface of the tool mount. Where a reversible insert with a second cutting surface is employed, the non-working cutting surface of the insert is protected from engagement with the workpiece while simultaneously engaging a stop surface on the mount to limit movement of the insert on the mount. The major interface between the mount and the insert comprises axially extending serrations formed on both the mount and insert. The serrations on the two engaged surfaces mesh to provide a large area contact surface that broadly distributes the displacement forces created during the milling operation. As a result, wear is distributed more uniformly over the mount surface, and the total wear at any given contact point between the insert and the mount is minimized. Only a single axial end surface is required to resist the axially directed forces imposed on the insert during the milling operation. The mating insert and tool surfaces of the present invention are simple and quick to fabricate and are consequently less expensive than those of prior art devices.

The broad area of the serration surfaced interface between the insert and mount of the present invention provides ample structural support preventing displacement of the insert without resort to an overly thick insert or an overly thin mount. Accordingly, the mount design of the present invention prevents chattering and insert breakage while maintaining the required alignment of the mount and insert during the milling operation.

From the foregoing, it will be appreciated that a primary object of the present invention is to provide a mechanism for securing an insert to a tool mount whereby the insert will remain secured to the tool mount in proper alignment during its use in a milling operation.

It is also an object of the present invention to provide broad area contacting surfaces between an insert and a tool mount such that the contacting area between the two components distributes displacement forces over a broad area to thereby minimize wear of the contacting surfaces.

A feature of the present invention is to provide a mounting technique for securing a reversible insert to a tool mount wherein the new cutting edge of the insert is retained in a secure, properly oriented position even after the tool mount experiences wear in the mounting surface.

Another feature of the present invention is to provide an insert and tool mount assembly employing multiple, axially extending serrations on the insert and tool mount that engage and hold the insert on the tool mount in proper alignment as the tool mills a workpiece.

It is a further feature of the present invention to provide a tool body mount surface having a plurality of parallel, axially extending, complementary V-shaped ridges and recesses, that are adapted to mate with a similar mount surface on a tool insert wherein the ridges and recesses of the two mount surfaces mesh and engage fully along the walls of the ridges.

These, as well as other, objects, features and advantages of the present invention will be more fully described and appreciated by reference to the following drawings, specification and claims.

DESCRIPTION OF THE PREFERRED EMBODIMENTS

Figure 1:
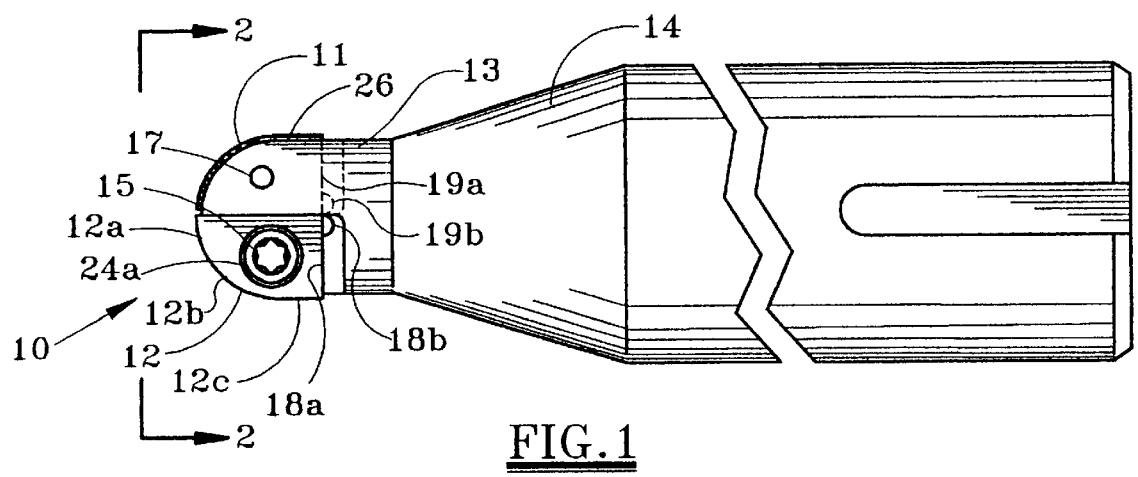
FIG. 1 is an elevation of a tool of the present invention, partially broken away, equipped with a removable insert of the present invention.

A ball nose end mill of the present invention is illustrated generally at 10 in FIG. 1. The end mill 10 is equipped with two removable cutting inserts 11 and 12. The inserts 11 and 12 are secured to a tool mount section 13 formed at the end of a cylindrical tool holder 14.

The insert segment 12 is secured to the mount section 13 with a threaded retention screw 15. The screw 15 extends through an opening bore 16 formed through the insert and threadably engages a tapped hole extending into the mount section 13. The insert 11 is held on the mount section 13 with a similar retention screw 17.

Figure 2:
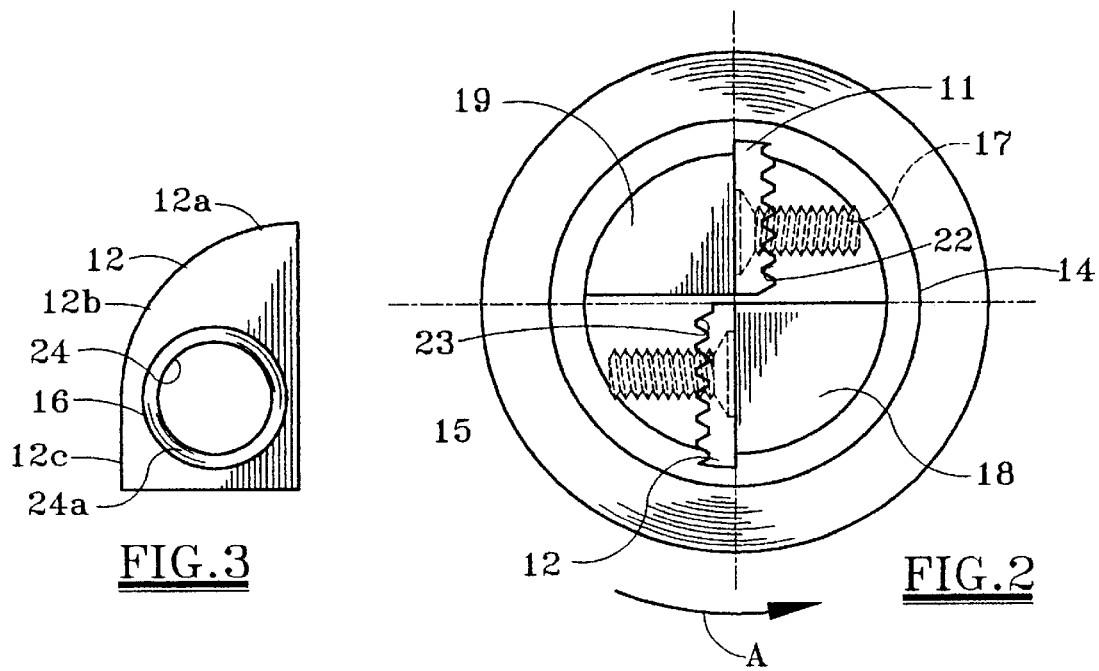
FIG. 2 is an end view taken along the line 2—2 of FIG. 1.

Referring jointly to FIGS. 1 and 2, the insert 12 is carried in a seat of a pocket 18 formed in the end of the mount section 13. A seat in a pocket 19 formed diagonally across the mount section 13 carries the insert 11. A pocket wall 18a is formed at the base of the pocket 18 to limit the axial movement of the insert 12. A similar wall 19a formed at the base of the pocket 19 limits the axial movement of the insert 11. A corner relief 18b is provided in the pocket 18 to accommodate the sharp corner of the insert 12. A similar corner relief 19b is provided in the corner of the pocket 19.

The seat of the pocket 19 is provided with a planar, axially extending serrated mounting surface 22 that is designed to mate with the planar, serrated mounting surface on the rear face of the insert 11. A similar mounting surface 23 is formed in the seat of the pocket 18 for mating with the rear serrated mount surface of the insert 12. The surfaces 22 and 23 are in the form of multiple, elongate projections with complementary parallel elongate recesses alternately disposed over a major portion of the seats of the pockets 19 and 18. The serrated surface configuration of the surfaces 22 and 23 forms an enlarged area of contact for engagement with the mating contact surfaces formed on the inserts 11 and 12.

Figure 3:
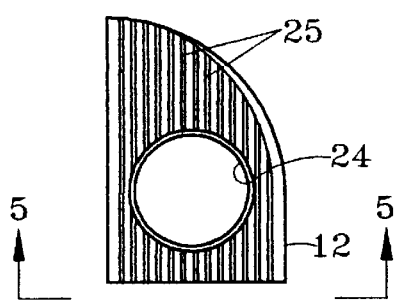
FIG. 3 is an enlarged front elevation of a single edge cutter insert of the present invention.
Figures 4, 5:
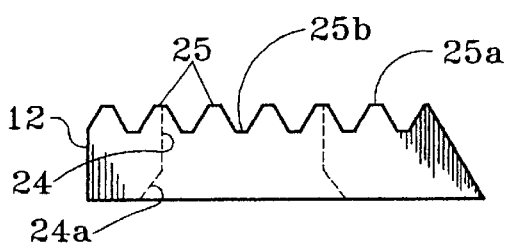
FIG. 4 is a rear view of a serrated mounting surface of the present invention on the contact side of the insert of FIG. 3.
FIG. 5 is an end view, taken along the line 5—5 of FIG. 4, illustrating a serration profile of the insert.

Details in the construction of the inserts may best be described by joint reference to FIGS. 3, 4, and 5, illustrating an enlarged view of the insert 12. The insert body has a front planar surface with a mounting opening 24 through the insert body. The opening 24 is provided with a recessed, beveled section 24a on the front side of the insert. The rear mounting surface of the insert 12 is provided with multiple serrations 25. When mounted in the pocket 18 on the mount section 13, the serrations 25 extend substantially axially with the axis of the tool 10. The serrations 25 may be angled slightly relative to the tool axis due to the rake angle of the cutter position. The individual serrations 25 have truncated V-shaped ridges 25a, as indicated best in FIG. 5. V-shaped root spaces 25b between serrations are similarly truncated to produce a complementary profile to that of the ridges. Similar serrations 26 are formed on the rear mounting surface of the insert for engagement with the mounting surface 22 of the pocket 19 as indicated in FIG. 1. The tapered surfaces of the mating serrations in the mount surfaces and associated inserts function to properly align the insert with its associated mounting surface and provide a larger area of surface contact for distribution of the displacing forces produced during the milling operation.

The dimensions and positioning of the insert 11 are such that when mounted on the tool 10, the insert cuts material from the center to the outside edge of the cut being formed in the workpiece. The insert 12 is smaller than the insert 11 and does not extend to the center of the cut. The cutter 12 is positioned such that it mills the area of the cut from a point just short of the center to the circular edge of the cut. The inserts 11 and 12 are thus configured and arranged on the tool mount 13 to mill a cylindrical, hemispherical base bore into the workpiece (not illustrated) when the mill is rotated in the direction indicated by the arrow A in FIG. 2.

During the initiation of the milling operation as the mill 10 is applied to a flat surface workpiece, the reaction forces acting on the inserts 11 and 12 tend to force the inserts axially against the pocket walls 19a and 18a, respectively. At this point, the forces are primarily directed against the front cutting surfaces such as the surfaces 12a of the cutter 12. As the mill increasingly penetrates the workpiece, a greater portion of each of the curved leading cutting edges of the inserts 11 and 12 begins to engage the sidewall being created in the milled opening. The forces acting on the cutter at this point include the combined tangential, lateral and axial forces exerted at an intermediate cutting surface such as 12b in addition to the axial forces exerted at 12a. When the insert is fully received within the forming borehole of the workpiece, the forces acting on the inserts further include side radial and tangential forces such as imposed at the side cutting surface 12c. The resultant increasing forces action on the milling inserts produce increasing forces tending to displace the inserts from their engagement with the mounting surfaces 22 and 23. The interlocking engagement of the serrations in the insert and tool mount resist the radial, or lateral, forces applied from varying directions that tend to move the insert over the mounting surface. The forces resisting this movement are uniformly dispersed over the large serrated mounting surface to prevent the wear and structural failure that can occur when the reaction forces are concentrated along a limited area of the insert or mount.

In use, the inserts 11 and 12 are secured to the mounting surfaces 22 and 23, respectively, by an attachment mechanism such as the screws 17 and 15, respectively. The beveled surface 24a surrounding the opening 24 through the insert 12 cooperates with a similar bevel adjacent the head of the screw 15 to seat and center the insert as the screw is tightened into the mount section 13. The primary function of the screw 15 is to keep the insert 12 engaged with the mount surface 23. Resistance to the reaction forces of milling is provided by the mating serrations of the insert and mounting surfaces and the pocket walls of the mount section. The insert 11 and screw 17 function similarly with the mounting surface 22 in the pocket 19.

When the inserts 11 and 12 are worn, they are removed by releasing the retaining screws 15 and 17, and new inserts 11 and 12 are attached to the mounting section 13 as previously described.

Figure 6:
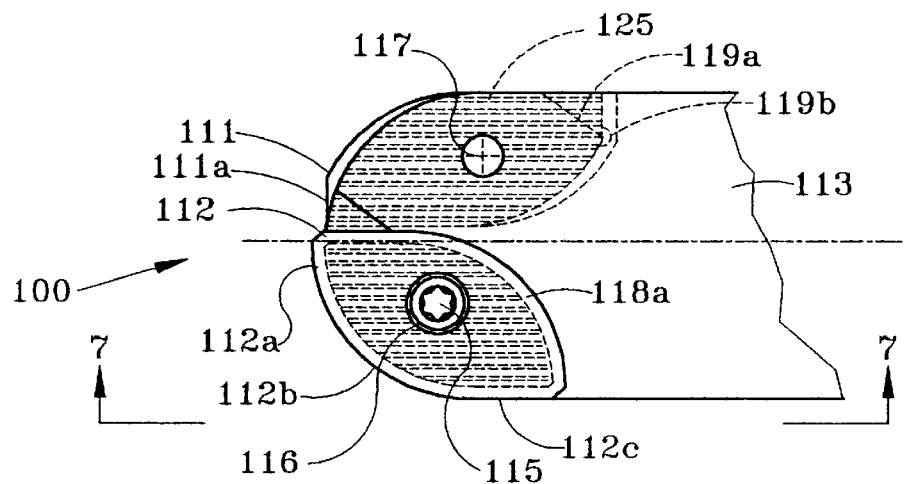
FIG. 6 is an elevation of a modified tool of the present invention, partially broken away, equipped with a reversible, double cutting surface insert of the present invention.

A modified form of the present invention is indicated generally at 100 in FIG. 6. The tool assembly 100 employs reversible inserts having double cutting surfaces to allow them to be rotated on the tool when the first set of cutting surfaces has worn. Unless otherwise noted, the reference numbers used in FIGS. 6–11 are greater by 100 than the numbers employed for similar or equivalent features in the embodiment of the invention illustrated in FIGS. 1–5.

As illustrated in FIG. 6, the tool assembly 100 is equipped with two disposable, reversible cutting inserts 111 and 112 that are secured to a mount section 113 of the tool assembly 100. The mount section 113 is formed at the end of a tool body 114 and is adapted to be secured in a machine tool for milling a workpiece in the manner described with reference to the tool of FIGS. 1–5. The insert 112 is secured to the mount surface by a threaded screw 115 that extends through an opening 116 in the insert body and is threadably received within a tapped opening in the mount section. A similar screw 117 holds the removable insert 111 to the mounting section 113. The insert 112 is received in a pocket 118 formed in the end of the tool mount while the insert 111 is formed in a diagonally disposed pocket 119. The walls 118a and 119a of the pocket 118 and 119 respectively provide a stop preventing axial displacement of the inserts from their mounted position on the mount section 113. A mounting surface 122 engages and supports the insert 111 while a similar mounting surface 123 engages and supports the insert 112. Serrations 125 formed on the insert 112 mate with similar serrations formed on the mounting surface 123 in the pocket 118.

Figure 8:
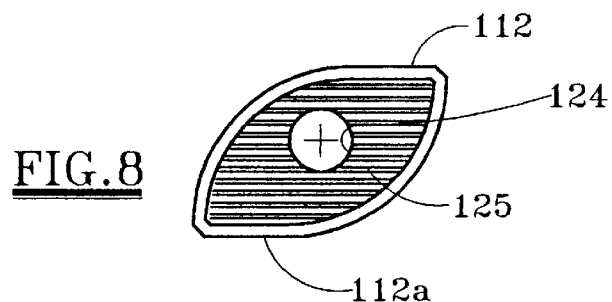
FIG. 8 is a bottom view of a first double edge cutting surface insert of the present invention.
Figure 7:
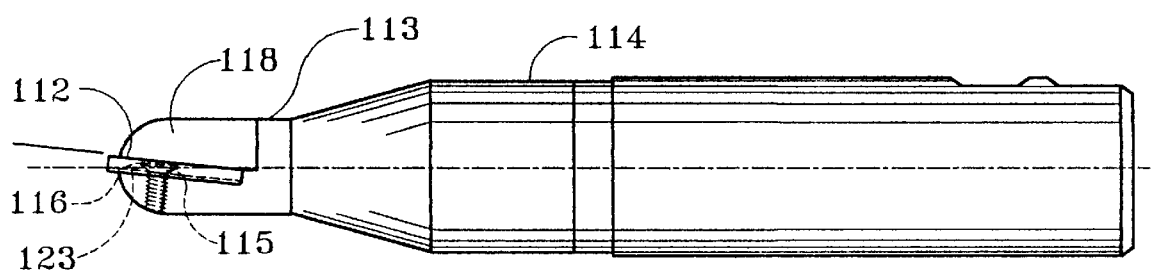
FIG. 7 is a side elevation taken along the line 7—7 of FIG. 6.

As illustrated in FIGS. 6 and 8, the cutter 112 includes cutting surfaces along the peripheral edges of the cutter body. The cutting surfaces are active when mounted as illustrated include a front cutting surface 112a, an intermediate cutting surface 112b, and a side cutting surface 112a. The serrations 125 extend substantially parallel to the side cutting surface 112c to resist the lateral displacement forces exerted on the cutter during the milling operation.

Figure 9:
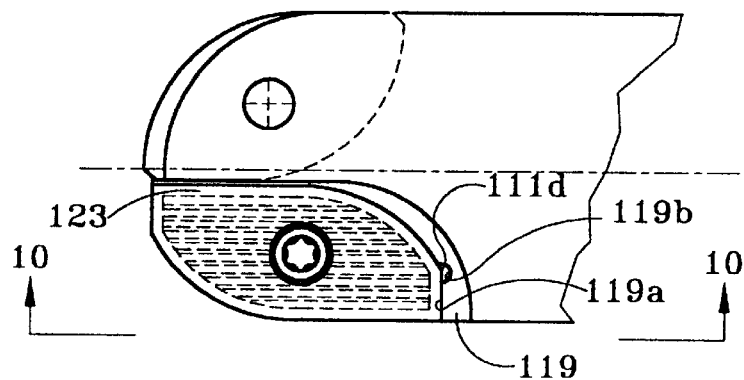
FIG. 9 is a rear side elevation of the cutter illustrated in FIG. 6.
Figure 11:
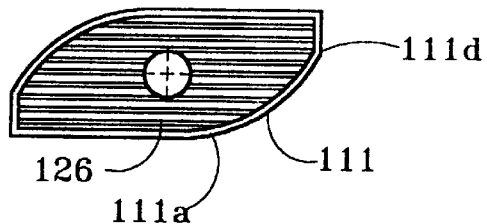
FIG. 11 is a bottom view of a second double cutting surface insert of the present invention.

FIG. 9 illustrates details in the construction of the pocket 119 that includes a radius area 119b. The radius section 119b of the pocket 119 is designed to receive a shoulder or corner 111d formed on the insert 111.

Figure 10:
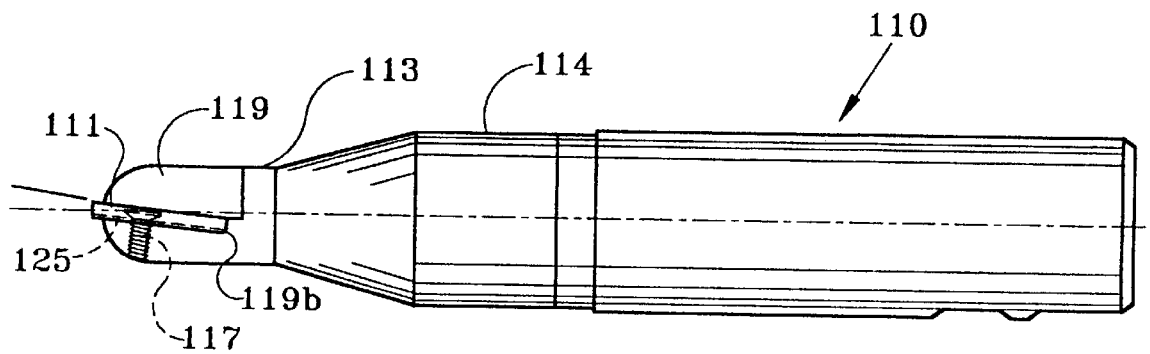
FIG. 10 is a side elevation taken along the line 10—10 of FIG. 9.

It may be noted with reference to FIG. 10 that the planar body of the inserts 111 and 112 is inclined relative to the central axis of the tool body 114. This orientation of the insert on the tool provides a desired rake angle that enhances the cutting effect of the tool. It may be appreciated that other orientations may be employed as desired to achieve a specific effect.

In operation, the inserts 111 and 112 are secured to the mount section 113 of the tool 110 and employed in the milling operation using their exposed peripheral cutting edges. When the edges are worn, the retaining screws 117 and 115 are removed and the inserts are rotated 180 degrees and reattached to the mount section to present new cutting edges to the workpiece. As with the tool of FIGS. 1–5, the serrations mating between the inserts and mount sections hold the inserts fixed relative to the mount to properly maintain the desired cutting orientation and to evenly dispense the forces tending to displace the inserts. The reaction forces are spread through the large surface area created by the serrations so that the effects of wear and stress concentrations are minimized to extend the life and improve the operability of the milling tool.

While preferred forms of the present invention have been described, it will be appreciated that various modifications in the operation and construction of the invention may be made without departing from the spirit and scope of the present invention which is more fully defined in the following claims.

What is claimed is:

1. A removable cutter element for use with a machine tool comprising:

a cutter body having a contact surface adapted to engage and mater with a mounting surface of the machine tool;

a cutting surface formed along a peripheral edge of said cutter body, the cutting surface being curved and extending between a front cutting surface and a side cutting surface substantially perpendicular to the front cutting surface;

multiple elongate projections and parallel elongate recesses alternatively disposed over a major portion of said contact surface for forming an enlarged surface area for contact with the mounting surface of the machine tool, said projections and said recesses extending in a direction substantially parallel to said side cutting surface; and a mounting opening extending through said cutter body and through said contact surface for receiving an attachment mechanism for securing said cutter element to the mounting surface of the machine tool.

2. A cutter element as defined in claim 1, wherein said cutting surface is formed on opposing peripheral edges of said cutter body to provide multiple alternative cutting surfaces on said cutter body.

3. A cutter element as defined in claim 1, wherein said projections and said recesses have substantially identical complementary cross-sectional profiles.

4. A cutter element as defined in claim 3, wherein said profiles comprise a truncated V-shape.

5. A cutter element as defined in claim 3, wherein said projections and said recesses are serrations formed over a major portion of said contact surface.

6. A cutter element as defined in claim 5, wherein said serrations have substantially identical cross-sectional profiles comprising truncated V-shaped ridges.

7. A cutter as defined in claim 1, wherein:
said projections and said recesses are serrations formed over a major portion of said contact surface; and
said serrations have substantially identical cross-sectional profiles comprising truncated V-shapes.

8. A ball nose end mill having one or more removable cutter inserts comprising:
an axially extending tool body;
a tool mounting surface for securing a removable cutter insert;
a cutter insert carried on said tool mounting surface, said cutter insert including a curved cutting surface extending between a front cutting surface and a side cutting surface substantially perpendicular to the front cutting surface;
a contact surface formed on said cutter insert for engagement with said tool mounting surface;
axially extending tool serrations formed on said tool mounting surface;
axially extending cutter serrations formed on said insert contact surface, said tool and cutter serrations having similar cross-sectional profiles whereby said tool and cutter serrations mesh to prevent relative lateral movement of said cutter insert and said end mill, said tool serrations and said cutter serrations extending in a direction substantially parallel to said side cutting surface; and
a mounting opening extending through said cutter insert and through said contact surface for receiving an attachment mechanism for securing said cutter insert to the tool mounting surface of the tool body.

9. A ball nose end mill as defined in claim 8, further comprising:
a removable cutter insert retaining mechanism for temporarily securing said cutter insert to said tool body.

10. A ball nose end mill as defined in claim 8, wherein:
said tool serrations and said cutter serrations have substantially identical V-shaped cross-sectional crest and root profiles.

11. A ball nose end mill as defined in claim 10, wherein said crest and root profiles are truncated.

12. A ball nose end mill as defined in claim 8, wherein said cutter insert includes multiple cutting surfaces whereby said cutter insert is positionable on said tool body to present a selected one of the multiple cutting surfaces to a workpiece.

13. A ball nose end mill as defined in claim 9, wherein:
said tool serrations and said cutter serrations have substantially identical V-shaped cross-sectional crest and root profiles.

14. A ball nose end mill as defined in claim 11, wherein said cutter insert includes multiple cutting surfaces whereby said cutter insert is positionable on said tool body to present a selected one of the multiple cutting surfaces to a workpiece.

15. A ball nose end mill as defined in claim 8, further comprising:
an axial stop shoulder on said tool body for limiting the axial movement of said cutter insert.

16. A ball nose end mill as defined in claim 10, further comprising:
an axial stop shoulder on said tool body for limiting the axial movement of said cutter insert.

17. A ball nose end mill as defined in claim 12 further comprising:
an axial stop shoulder on said tool body for limiting the axial movement of said cutter insert.

* * * * *